3,228,150
METHOD OF SUPPORTING GLASS FOR POLISHING
Frank Moser, Sarver, and Richard R. Lewchuk, Allison Park, Pa., assignors to Pittsburgh Plate Glass Company, Pittsburgh, Pa., a corporation of Pennsylvania
No Drawing. Filed Feb. 13, 1963, Ser. No. 258,145
8 Claims. (Cl. 51—283)

This invention relates to improved non-corrosive aqueous compositions used to impregnate glass contacting cloth table felts which cover cast iron polishing tables employed to support the glass during polishing, and the improved polishing methods attendant to the use of such compositions.

More specifically the present invention is directed to the use of aqueous solutions of zinc chloride containing from about 1 to 50 percent by weight of zinc chloride as an impregnant for cloth felt pads or blankets which cover polishing tables upon which the glass rests during polishing of the upper surface thereof. Small amounts of an inert, non-corrosive sequestering agent, e.g., from 0.1 to 5.0 weight percent based on total solution, can be added to aid in dissolving the zinc chloride in water and maintaining the zinc chloride in aqueous solution.

In the basic glass polishing method to which the present invention is directed, the lower surface of the flat glass plate contacts a liquid saturated felt blanket or pad which covers the glass supporting polishing table. The felt is secured to the polishing table in any suitable fashion, e.g. by use of an adhesive. The saturated felt pad serves to hold the glass plate in proper position by preventing rotation of the glass plate during polishing. This holding power is due primarily to the surface tension of the saturating liquid film between the lower surface of the glass plate and the foraminous table covering material capable of being saturated with liquids, e.g., woven and non-woven cloths, spongy materials, felts, etc. In this regard the liquid exerts a strong vacuum-like force on the glass thereby retaining it in stationary position. While the glass is thus held stationary, the upper surface of the glass plate is polished by suitable overhead oscillating or rotary polishing runners using an aqueous slurry of abrasive particles as a polishing medium, e.g., rouge particles. These runners rub the glass surface with the abrasive rouge particles to produce the smooth-surfaced polished glass plates.

The use of a liquid saturated felt pad to retain glass in stationary position during polishing is a relatively recent innovation in the glass polishing field, and constitutes a marked improvement over the previously employed method of positioning which involved imbedding the lower surface portion of the glass plate in a bed of wet plaster of Paris. According to this previous procedure the plaster is allowed to harden prior to polishing the upper glass surface. After this surface is polished, then the glass is removed from the plaster bed and cleaned; the hardened plaster of Paris is broken, removed from the bed and discarded; the bed is cleaned; and then a fresh plaster of Paris is placed in the bed to enable positioning the glass so that previously unpolished surface can be subjected to polishing. This manner of positioning glass during polishing is time-consuming and expensive compared to the recently developed more efficient liquid-saturated felt method.

However, certain vexing problems arose in the use of the liquid-saturated felt method. For example when water alone was employed as the saturating liquid cloth etching marks imparted by the felt pads or blankets developed on the polished glass surfaces causing an unduly high number of rejects. This was especially undesirable since at the time the cloth etch became apparent the polished glass had already completed its entire manufacturing process. Hence the rejection of the polished glass at this stage constitutes an expensive loss.

A worthwhile advance was made toward the solution of the cloth etch problem by the use of aqueous solution of ammonium sulfate as the liquid impregnant instead of water alone. The use of ammonium sulfate aqueous solutions retards the development of cloth marks on the polished surfaces of the glass while maintaining the quality of the polished glass.

However, the use of ammonium sulfate aqueous solutions as the liquid saturating impregnant led to other problems. The chief problem caused by use of ammonium sulfate aqueous solutions is their highly corrosive action on the cast iron polishing tables and other metal fixtures present on the polishing line. Since these polishing tables are quite expensive, this problem is highly objectionable as it prematurely curtails the useful life of the polishing tables. Severe corrosion of the polishing tables has been encountered using comparatively dilute aqueous solutions of ammonium sulfate, viz., ammonium sulfate aqueous solutions containing as low as two percent by weight ammonium sulfate and even lower. Moreover, the use of such low weight concentrations of ammonium sulfate is accompanied by an increasing presence of cloth marks and etching on the polished glass thereby indicating that reducing the weight concentration of ammonium sulfate merely complicates the problem of polishing table corrosion by reducing the efficiency of the aqueous ammonium sulfate solution in combating cloth marks and etching.

According to the present invention, the desired retardation of cloth marks and etching on the polished glass surfaces can be achieved readily while inhibiting corrosive action on the cast iron metal polishing tables and other metal equipment along the polishing line by impregnating the cloth felt pads or blankets with an aqueous acidic composition containing zinc chloride, usually in amounts ranging from about 1 to 50 percent by weight. Moreover, these two salient advantages can be achieved without reduction in the quality of the polished glass articles, or reduction in the speed at which this polishing operation can be conducted. In fact an increase in polishing speed has been noted to accompany the use of aqueous acidic zinc chloride. Furthermore the aqueous acidic zinc chloride felt impregnating compositions employed in accordance with this invention have no adverse effect on the polishing rouge in that when excess aqueous acidic zinc chloride solution drains from the impregnated saturated cloth felt pads or blankets and accumulates in the reclaimed polishing slurry no deleterious effects are noted in the reclamation and re-use of the polishing rouge for subsequent polishing operations.

Under certain circumstances it is desirable to add an inert, non-corrosive sequestering agent to the aqueous acidic zinc chloride solutions to aid in dissolving the zinc chloride in water and maintaining the zinc chloride in solution. The use of such sequestering agents is specially helpful when hard water is used to prepare the table felt impregnating solutions although they can also be used to advantage when employing soft or medium hard water. For example the use of such sequestering agents effectively reduces clogging of the applictaor heads, plumbing and filtering parts of the apparatus employed to deposit the aqueous acidic zinc chloride solutions onto the cloth table felts. As suitable inert non-corrosive sequestering agents, the following materials can be listed as exemplary: sodium citrate, potassium citrate, magnesium citrate, hydroxylamine hyrochloride, sodium bisulfate, and ammonium chloride. The sequestering agent is added in small amounts, viz., from about 0.1 to 5.0 percent by weight. Usually the weight concentration of the sequestering agent is very low, and it is seldom necessary to use more than 1 percent by weight thereof. Consistently good results are attainable using a weight concentration of less than 0.5 percent when using alkali metal citrates, e.g. sodium citrate or alkali earth metal citrates, e.g. magnesium citrate even when employing medium hard water to prepare the aqueous acidic zinc chloride table felt impregnating solutions. Of course, the exact concentration of sequestering agent will depend upon several factors including: The degree of hardness of water, the relative efficiency of the particular sequestering agent in its ability to dissolve zinc chloride and maintain it in solution, the tendency of the sequestering agent to exert a corrosive influence on ferrous metals, especially cast iron, at a given concentration, its effect upon the pH of the aqueous zinc chloride solution, etc. The concentration of sequestering agent should not be so high as to either establish a strongly alkaline pH in the aqueous zinc chloride solutions, or exert corrosive attack on the polishing tables and metal fixtures. The use of sequestering agents, which must be used in high concentrations in order to effectively maintain zinc chloride in solution, should be avoided if such concentrations corrode the metal polishing tables or establish a strongly alkaline pH. The aqueous acidic zinc chloride solutions are prepared conveniently by dissolving the zinc chloride salt in water. When a sequestering agent is employed, the sequestering agent is usually added to the water and dissolved therein prior to the addition of the zinc chloride salt. The aqueous solution is usually stirred vigorously to aid in dissolving the sequestering agent and zinc chloride salts. The water can be heated to aid in dissolving the salts. Actually zinc chloride salt is fairly soluble especially in pure distilled water. However, impurities in the water tend to precipitate the zinc out of solution, probably as zinc hydroxide. The sequestering agent is especially helpful in keeping the zinc in aqueous solution.

The pH of the aqueous zinc chloride solutions should be maintained acidic, and usually at a pH ranging from about 4 to 6.5 with the preferable pH range being from about 4.0 to 6.0. After extended usage in a given campaign or repeated campaigns, the pH will tend to rise toward neutral pH and even alkaline pH. Small rises in pH can be tolerated, and satisfactory results can be achieved at neutral pH, viz., 7.0, and even weakly alkaline pH can be tolerated for short periods of time. However, the pH of the aqueous zinc chloride table felt impregnating solutions should not be allowed to rise to 8.0 or above even for short periods of time. At such alkaline pH levels available evidence indicates that some attack takes place on the metal polishing tables and fixtures, and that insoluble residues form which build-up on the tables felts and eventually at the polishing heads. These precipitates or residues can also be found, but to a lesser extent on the polished glass surfaces even when the polished glass is washed after polishing.

Hence in order to avoid these and other detrimental effects and achieve the full meassure of the benefits attainable according to this invention the pH of the aqueous zinc chloride solutions is maintained acidic, and preferably at a pH ranging from about 4.0 to 6.0.

The weight concentration of zinc chloride in the aqueous acidic zinc chloride table felt impregnating solutions can vary considerably. Usually the weight concentration of zinc chloride ranges from about 1 to 50 percent, but lesser or greater amounts can be employed. For example, satisfactory results can be achieved over short periods using aqueous acidic zinc chloride solutions containing as low as 0.5 percent by weight zinc chloride and even lower when small amounts of a sequestering agent, e.g. ⅛ percent by weight of sodium citrate, are employed. Also the zinc chloride weight concentration can exceed 50 percent, but no discernable advantages accrue thereto.

Consistently superior results can be achieved over extended periods of time using zinc chloride weight concentrations ranging from 2 to 30 percent by weight. When using the lower weight concentrations, e.g., 2 to 10 percent, the use of a sequestering agent is recommended.

The following examples serve to further illustrate the invention, and should not be construed as limiting the invention to the specific concentrations, procedures, and prevailing conditions set forth therein.

EXAMPLE I

Varying amounts of zinc chloride are dissolved in ordinary tap water to produce zinc chloride aqueous solutions having the respective weight concentrations and pH noted below in Table I. These solutions are prepared by adding the zinc chloride to tap water previously placed into the stainless steel tanks and agitating. Where sodium citrate is employed, the sodium citrate is first dissolved into the water using a propeller-type mixer or similar agitating device. Then the zinc chloride is added and the agitation continued until the zinc chloride is dissolved. The same procedure is used in preparing the ammonium sulfate solutions.

Each solution is freshly prepared and then allowed to sit overnight prior to saturation of the table felts. Both the zinc chloride and ammonium sulfate solutions are applied to nylon table felts by the same type of applicator mechanisms. Prior to the placement of the table felts on the tables, the condition of the table surface is noted.

An applicator head on each polishing table puddles the respective aqueous impregnating solutions before heavy metal rollers which roll the table felt impregnant solutions onto the table felts on each table. Each solution is tested on a separate cast iron polishing table provided with a new nylon table felt.

The polished side of grinder smooth glass plates is placed on the thus saturated table felts after excess impregnating solution is removed by a roller. The table felts are impregnated in cycles, viz., before the first polishing cycle and after the completion of each two hour polishing cycle. Prior to each impregnation the tables with the felts thereon are washed with water which is then removed by a roller as the polishing table passes along the polishing line. Then the respective felt impregnating solutions are applied thereto.

The effect of any additional corrosion from the respective impregnating solutions is noted at the end of the below indicated treatment periods by removing the table felts and inspecting the condition of the cast iron polishing table surface for corrosion. Since all of test polishing tables are surface scoured and cleaned prior to the test, the condition of the polishing tables reflect the corrosive effect, if any of the various impregnants on the tables at each period of inspection. The results of these corrosion inspections are tabulated below in Table I. The concentrations of zinc chloride and ammonium sulfate are given in weight percents. The pH values at which the respective solutions are employed are also listed.

Prior to inspecting all tables for corrosion, the table felts are removed and the tables are subjected to cleaning with a Carborundum cloth. Inspection of the tables whose felts are impregnated with aqueous ammonium sulfate solutions reveal heavily rusted and pitted surfaces difficult to remove even after repeated Carborundum cloth cleaning. In sharp contrast thereto inspection of the polishing tables whose felts are impregnated with aqueous acidic zinc chloride solutions show far more favorable results for all concentrations of zinc chloride.

Table I

DEGREE OF CORROSION TO CAST IRON SAMPLES IN CONTACT WITH VARIOUS SOLUTIONS

| Aqueous solutions | pH | 24 hours | 48 hours | 168 hours | 326 hours |
|---|---|---|---|---|---|
| 50% $ZnCl_2$ | 4.4 | None | None | None | None. |
| 40% $ZnCl_2$ | 4.6 | ---do--- | ---do--- | ---do--- | Do. |
| 30% $ZnCl_2$ | 5.0 | ---do--- | ---do--- | ---do--- | Do. |
| 20% $ZnCl_2$ | 5.5 | ---do--- | ---do--- | ---do--- | Do. |
| 10% $ZnCl_2$ | 5.8 | ---do--- | ---do--- | Slight | Slight. |
| 5% $ZnCl_2$ | 6.0 | ---do--- | Slight | ---do--- | Light. |
| 4% $ZnCl_2$ | 6.1 | Slight | ---do--- | Light | Do. |
| 3% $ZnCl_2$ | 6.1 | ---do--- | ---do--- | ---do--- | Do. |
| 2% $ZnCl_2$ | 6.2 | ---do--- | Light | ---do--- | Do. |
| 10% $ZnCl_2$* | 5.7 | None | None | None | None. |
| 5% $ZnCl_2$* | 5.7 | ---do--- | ---do--- | ---do--- | Slight. |
| 4% $ZnCl_2$* | 5.7 | ---do--- | ---do--- | Slight | Do. |
| 3% $ZnCl_2$* | 5.7 | ---do--- | ---do--- | ---do--- | Do. |
| 2% $ZnCl_2$* | 5.7 | ---do--- | ---do--- | ---do--- | Do. |
| 1% $ZnCl_2$* | 5.7 | ---do--- | ---do--- | ---do--- | Light. |
| 10% Amm. sulfate | 4.0 | Moderate | Heavy | Very heavy | Very heavy. |
| 6% Amm. sulfate | 5.5 | ---do--- | ---do--- | ---do--- | Do. |

* Contain sodium citrate, ½% by weight.

From the test results in Table I it is clear that the aqueous acidic zinc chloride table felt impregnating solutions of this invention are superior to ammonium sulfate solutions with respect to their ability to inhibit corrosion of the cast iron surfaces.

Moreover, the aqueous acidic zinc chloride table felt impregnating solutions of this invention have no observable deleterious effect on the quality of the polished glass plates, and may even contribute somewhat to obtaining higher quality. For example, inspection of the polished glass plates after washing reveals clean surfaces where aqueous acidic zinc chloride solutions are used as the table felt impregnant. However, slight residues are present after washing the polished plates where aqueous ammonium sulfate is used as the table felt impregnant.

EXAMPLE II

The procedure of Example I is repeated using aqueous acidic zinc chloride solutions containing 2, 6, 8, 10 and 20 percent by weight zinc chloride and ⅛, ⅙ and ¼ percent by weight sodium citrate. The effect of these table felt impregnants is noted as regards: corrosion of the polishing tables, cloth marks and etching on the polished glass surfaces, and polishing speed. Comparative tests are also conducted using aqueous acidic ammonium sulfate solutions containing 2, 6 and 10 percent by weight of ammonium sulfate, as well as plain tap water.

The plain tap water yields heavy, repeated occurrence of cloth marks and etch on the surfaces of the polished glass at a normal polishing speed of 120 inches per minute. In view of this unsatisfactory condition no attempt is made to increase polishing speed as this would at best merely serve to increase the rate at which polished glass containing these flaws is produced.

The aqueous ammonium sulfate solutions yield increased corrosion of the cast iron polishing tables at a polishing speed of 120 inches per minute as well as producing a build-up of residues on the table felts and metal apparatus along the polishing line. While the 2 percent ammonium sulfate solution results in somewhat less corrosion of the polishing tables, its use increases the presence and number of cloth marks and etch on the polished glass surfaces, thus indicating a reduction in ability to retard cloth marks and etching as compared to the aqueous solutions containing higher concentrations of ammonium sulfate.

No additional corrosive attack is observed on the cast iron polishing tables whose table felts are saturated with the aqueous zinc chloride solutions containing small amounts of sodium citrate. Moreover, these solutions are also effective in retarding cloth marks and etching on the polished glass surfaces at least to the same extent as the 6 and 10 percent ammonium sulfate aqueous solutions. Since both these favorable results are attainable at a normal polishing speed of 120 inches per minute, the polishing speed is progressively increased to determine if both these advantageous results continue to prevail at higher polishing speeds. Progressive increases in polishing speed to speeds of 150, 170, 185, 200, 240, 270 and 300 inches per minute and even higher. No detectable increase in corrosion is noted; nor is there any observable loss in retarding cloth mark and etching. Hence, it is concluded that when aqueous acidic zinc chloride solutions are used to saturate the table felts, the polishing speed can be increased substantially over normal speeds without encountering either increased polishing table corrosion or increased deposition of cloth mark and cloth etching from the cloth table felts onto the polished glass surfaces.

Further testing of these aqueous acidic zinc chloride solutions without any sequestering agent yields essentially the same results insofar as retarding polishing table corrosion and cloth marks and etching while sustaining increased polishing speed. However, when a sequestering agent is omitted, there is increased tendency to form a messy precipitate, probably zinc hydroxide, and the table felt impregnating solutions become cloudy after repeated use over extended periods. Hence, it is concluded that for optimum results a sequestering agent should be included.

Additional testing employing magnesium citrate, hydroxylamine hydrochloride and sodium bisulfate, respectively, as sequestering agents in place of sodium citrate produces essentially the same results in retarding polish table corrosion and cloth mark and etching while sustaining increased polishing speed as are attained when sodium citrate is used as sequestering agent. Moreover, the messy precipitate nuisance is overcome when either sodium citrate, magnesium citrate, hydroxylamine hydrochloride or sodium bisulfate is used as a sequestering agent.

While the invention has been illustrated in detail in the preceding examples, it should be realized that the invention in its broadest aspects is not necessarily limited to the particular conditions and concentrations set forth therein.

We claim:

1. In the process for polishing glass wherein a sheet of glass to be polished is placed upon an impregnated cloth supported by a polishing table and an exposed surface of said glass is subjected to a polishing operation, the improvement wherein said cloth is impregnated with an aqueous solution of zinc chloride to thereby preclude marking and etching of the surface of the glass in contact with said cloth and inhibit corrosion of the polishing table.

2. A process according to claim 1 wherein said aqueous solution of zinc chloride has a pH ranging from about 4 to 6.5 and contains from about 2 to 30 percent by weight zinc chloride.

3. A process according to claim 1 wherein said aqueous solution of zinc chloride contains sufficient amounts of a sequestering agent to effectively retain zinc chloride in solution.

4. A process according to claim 2 wherein said aqueous solution of zinc chloride contains from about 0.1 to 5 percent by weight of an inert non-corrosive sequestering agent to retain zinc chloride in solution.

5. A process according to claim 4 wherein said sequestering agent is sodium citrate.

6. In the process for polishing glass wherein a sheet of glass to be polished is placed upon an impregnated cloth supported by a polishing table and an exposed surface of said glass is subjected to a polishing operation, the improvement wherein said cloth is impregnated with an aqueous solution of zinc chloride having a pH ranging from about 4 to 6 and containing from about 2 to 10 percent by weight zinc chloride and from about 0.1 to 1 percent by weight of an inert non-corrosive sequestering agent to thereby preclude marking and etching of the surface of the glass in contact with said cloth and inhibit corrosion of the polishing table.

7. In the process for polishing glass wherein a sheet of glass to be polished is placed upon an impregnated cloth supported by a polishing table and an exposed surface of said glass is then polished at a sustained speed of from about 120 to about 300 inches per minute, the improvement wherein said cloth is impregnated with an aqueous solution of zinc chloride having a pH ranging from about 4 to about 6.5 and containing from about 1 to 50 percent by weight zinc chloride and from about 0.1 to 5 percent by weight of an inert non-corrosive sequestering agent to retain zinc chloride in solution, thereby precluding marking and etching of the surface of the glass in contact with said cloth and inhibiting corrosion of the polishing table.

8. In the process for polishing glass wherein a sheet of glass to be polished is placed upon an impregnated cloth supported by a polishing table and an exposed surface of said glass is then polished at a sustained speed of from about 120 to about 300 inches per minute, the improvement wherein said cloth is impregnated with an aqueous solution of zinc chloride having a pH ranging from about 4 to 6 and containing from about 2 to 30 percent by weight zinc chloride and from about 0.1 to 1 percent by weight of an inert non-corrosive sequestering agent to retain zinc chloride in solution, thereby precluding marking and etching of the surface of the glass in contact with said cloth and inhibiting corrosion of the polishing table.

References Cited by the Examiner

UNITED STATES PATENTS

| | | | |
|---|---|---|---|
| 93,617 | 8/1869 | Henry et al. | 117—139.5 |
| 178,403 | 6/1876 | Brockman | 51—20 |
| 1,911,587 | 5/1933 | Shetterly | 51—283 |
| 2,086,544 | 7/1937 | Dreyfus | 117—139.5 |
| 2,086,590 | 7/1937 | Whitehead | 117—139.5 |
| 2,343,186 | 2/1944 | Hopkinson | 117—138 XR |

FOREIGN PATENTS 397,878　8/1933　Great Britain.

OTHER REFERENCES

Uses and Applications of Chemicals and Related Materials, Gregory, 1939, pp. 645 and 646.

WILLIAM D. MARTIN, *Primary Examiner.*

RICHARD D. NEVIUS, *Examiner.*